United States Patent
Kimura et al.

(10) Patent No.: US 9,935,512 B2
(45) Date of Patent: Apr. 3, 2018

(54) PERMANENT MAGNET ROTATING ELECTRICAL MACHINE

(71) Applicant: HITACHI, LTD., Tokyo (JP)

(72) Inventors: Mamoru Kimura, Tokyo (JP); Masahiro Hori, Tokyo (JP); Tetsuo Fujigaki, Tokyo (JP); Youichi Matsumoto, Tokyo (JP); Motonobu Iiduka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 615 days.

(21) Appl. No.: 14/557,494

(22) Filed: Dec. 2, 2014

(65) Prior Publication Data

US 2015/0194851 A1 Jul. 9, 2015

(30) Foreign Application Priority Data

Jan. 9, 2014 (JP) .................... 2014-002079

(51) Int. Cl.
*H02K 1/27* (2006.01)
*H02K 1/32* (2006.01)

(52) U.S. Cl.
CPC ............. *H02K 1/32* (2013.01); *H02K 1/2766* (2013.01)

(58) Field of Classification Search
CPC .... H02K 1/276; H02K 1/2766; H02K 1/2773; H02K 1/32; H02K 9/02; H02K 9/04; H02K 9/06; H02K 9/08; H02K 9/10; H02K 9/12; H02K 9/14; H02K 9/16; H02K 9/18
See application file for complete search history.

(56) References Cited

U.S. PATENT DOCUMENTS

| 2008/0129129 | A1* | 6/2008 | Kori ................ H02K 1/276 310/58 |
| 2010/0127584 | A1 | 5/2010 | Gottfried |
| 2011/0241350 | A1* | 10/2011 | Kori ................ H02K 1/20 290/55 |

(Continued)

FOREIGN PATENT DOCUMENTS

JP 2012-039775 A 2/2012

OTHER PUBLICATIONS

German Office Action received in corresponding German Application No. 10 2015 200 159.8 dated Apr. 28, 2017.

*Primary Examiner* — Quyen Leung
*Assistant Examiner* — Eric Johnson
(74) *Attorney, Agent, or Firm* — Mattingly & Malur, PC

(57) ABSTRACT

In a permanent magnet rotating electrical machine including a stator, a rotor obtained by stacking a plurality of rotor cores arranged with magnet insertion holes in layers with gaps, and permanent magnets inserted to the magnet insertion holes, the magnet insertion holes are formed on both sides of the duct piece so as to depart from the duct piece disposed between the rotor cores as the magnet insertion holes extend from the side of the center of the rotor core to the outer circumference side, the magnet insertion holes are disposed so as to shift from the duct piece in the circumferential direction of the rotor, and inner circumference side voids having the length in the circumferential direction wider than the thickness in the circumferential direction of the permanent magnets are provided from the inner circumference side ends of the permanent magnets toward the duct piece.

10 Claims, 4 Drawing Sheets

(56) References Cited

U.S. PATENT DOCUMENTS

| | | | |
|---|---|---|---|
| 2012/0032539 A1* | 2/2012 | Hori | H02K 1/2766 |
| | | | 310/59 |
| 2012/0200193 A1* | 8/2012 | Sano | H02K 1/2766 |
| | | | 310/216.106 |
| 2013/0307358 A1* | 11/2013 | Parviainen | H02K 1/223 |
| | | | 310/61 |
| 2015/0162805 A1* | 6/2015 | Tsumagari | H02K 1/27 |
| | | | 310/59 |

* cited by examiner

PERMANENT MAGNET ROTATING ELECTRICAL MACHINE

BACKGROUND OF THE INVENTION

The present invention relates to a permanent magnet rotating electrical machine, and relates to a permanent magnet rotating electrical machine suitable to wind power generation for example.

In recent years, the introduction quantity of the wind power generation has been increasing dramatically, and, aiming improvement of economic efficiency and improvement of efficiency of the generator by increasing the capacity of one machine as well as reduction of the size and weight, a demand for a permanent magnet rotating electrical machine having a large capacity of 1 MW or more is increasing.

In applying the permanent magnet rotating electrical machine having a large capacity, even if the efficiency may be high, the loss thereof becomes large as an absolute value. Therefore, when the heat generation density is to be made nearly equal to that of a small capacity machine to reduce the loss, the size of the permanent magnet rotating electrical machine has to be necessarily enlarged. When the size of the permanent magnet rotating electrical machine is enlarged, the weight increases, the cost increases, therefore the construction cost of the windmill increases, and therefore it is necessary to reduce the size of the permanent magnet rotating electrical machine and to increase the heat generation density.

In order to achieve a rotating electrical machine with a high heat generation density, it is necessary to strengthen the cooling construction. Although to arrange a duct is considered to be one of the solution in a rotating electrical machine that does not use ordinary permanent magnets, examples of arranging a duct in a permanent magnet rotating electrical machine having a large capacity are quite rare until now.

Therefore, when a duct is to be arranged in a rotor of a permanent magnet rotating electrical machine, particularly in a multi-pole machine with several tens poles or more, the circumferential dimension of the rotor per one pole becomes small, and therefore there is a problem that the permanent magnet and the duct interfere with each other in inserting the permanent magnet and assembling of the rotating electrical machine becomes impossible.

In JP-A-2012-39775, a technology has been disclosed in which the leakage magnetic flux is reduced by enlarging the shape of the magnet insertion hole into an arc shape in a permanent magnet rotating electrical machine having an air duct.

SUMMARY OF THE INVENTION

In the technology described in JP-A-2012-39775, the electric characteristics and the stress are balanced by enlarging the magnet insertion hole into a circular shape and preventing the leakage magnetic flux between the poles, and there is no mention on the relationship between the permanent magnet and the duct piece in disposing the duct.

The object of the present invention is to provide a permanent magnet rotating electrical machine improving the assembling performance.

In order to achieve the object, the permanent magnet rotating electrical machine of the present invention is a permanent magnet rotating electrical machine including a stator having armature coils inside a plurality of slots formed in a stator core, a rotor obtained by stacking a plurality of rotor cores arranged with magnet insertion holes in layers with gaps, the gaps being obtained by interposing duct pieces between the rotor cores, and permanent magnets inserted to the magnet insertion holes, in which at least one of the duct pieces is disposed on a line extending from the center of the rotor core to the outer circumference side, the magnet insertion holes are formed on both sides of the duct piece so as to depart from the duct piece as the magnet insertion holes extend from the side of the center of the rotor core to the outer circumference side, the magnet insertion holes are disposed so as to shift from the duct piece in the circumferential direction of the rotor, and inner circumference side voids having the length in the circumferential direction wider than the thickness in the circumferential direction of the permanent magnets are provided from the inner circumference side ends of the permanent magnets toward the duct piece.

According to the present invention, it becomes possible to provide a permanent magnet rotating electrical machine improving the assembling performance.

Other objects, features and advantages of the invention will become apparent from the following description of the embodiments of the invention taken in conjunction with accompanying drawings.

DETAILED DESCRIPTION OF THE EMBODIMENTS

Below, embodiments of a permanent magnet rotating electrical machine of the present invention will be described using drawings. Also, a same reference sign is given to a same portion in each drawing. The description below is with respect to an example only, and it is not intended that the embodiments of the present invention are limited to the concrete aspects described below.

[Embodiment 1]

Figure 1:
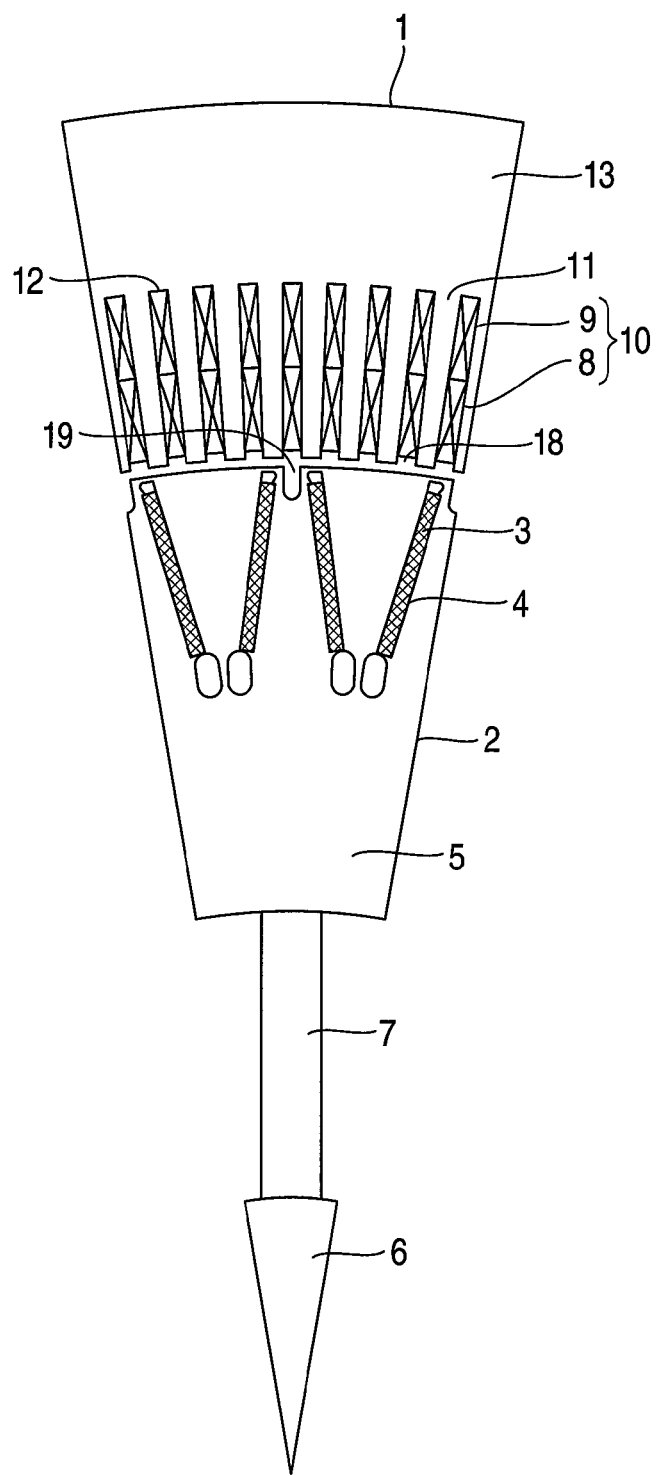
FIG. 1 is a sectional view of a portion of two poles showing a permanent magnet rotating electrical machine of a first embodiment of the present invention. (embodiment 1)

FIG. 1 shows a portion of two poles of a permanent magnet rotating electrical machine having 36 poles and 162 slots which is the first embodiment of the permanent magnet rotating electrical machine of the present invention.

In the present embodiment, a permanent magnet rotating electrical machine having the capacity of mainly several hundreds kW to several tens MW is described. As shown in FIG. 1, the permanent magnet rotating electrical machine related with the present embodiment is formed mainly of a shaft 6 that becomes a rotating shaft, a rotor 2 rotating through a spider 7 accompanying rotation of the shaft 6 and including permanent magnets 3, and a stator 1 disposed on the outside diameter side of the rotor 2 so as to oppose the rotor 2 leaving a gap 18 from the rotor 2.

The stator 1 is a distributed winding stator obtained by winding a coil 10 in a distributive manner around stator teeth 11 that are arranged in a stator core 13, and the distributed winding is made to continue in the circumferential direction. The coil 10 has a 3-phase winding of UVW, and, in the structure shown in the present embodiment, as an embodiment, a case the number of piece of slots is 162 and electrically 36 magnetic poles are made is described. Also, with respect to the coil 10, two coils in the top and bottom of an upper coil 8 and a lower coil 9 are disposed in a stator slot 12 that is located between the stator teeth 11. Further, although the present embodiment is described with an example of the stator of the distributed winding, it is a matter of course that the method of winding is not limited to the distributed winding, and other methods of winding are possible. As another embodiment, for example, there is a concentrated winding in which a coil is concentrically wound around the stator teeth.

The rotor 2 includes a rotor core 5 connected to the shaft 6 through the spider 7 and stacked in the axial direction of the shaft 6 and the permanent magnets 3 disposed inside magnet insertion holes 4 that are arranged on the outside diameter side in the inside of the rotor core 5, and the rotor rotates accompanying rotation of the shaft 6. Also, any number of pieces of the spider 7 will do as far as the torque can be transmitted. In the present embodiment, 8 pieces are selected although altogether thereof is not illustrated. Also, the present embodiment is configured to dispose magnets of a same polarity in a V-shape, and one pole is formed using two pieces of the permanent magnets 3. Although inter-pole ventilation passages 19 are arranged to allow easier ventilation in the present embodiment, when there is a margin in the temperature of the permanent magnet rotating electrical machine, the inter-pole ventilation passages 19 may not be arranged.

Figure 2:
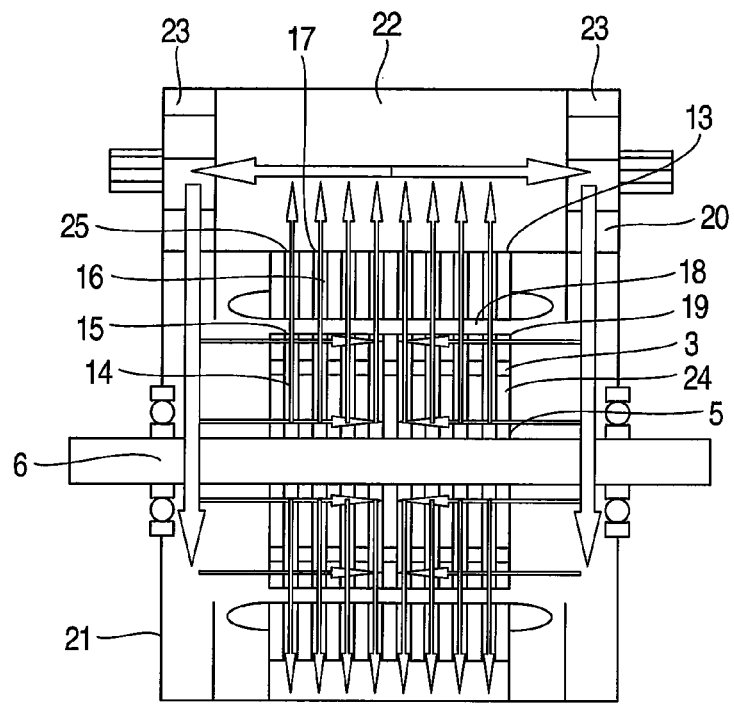
FIG. 2 is an axial sectional view showing the permanent magnet rotating electrical machine of the first embodiment of the present invention. (embodiment 1)

FIG. 2 shows an axial sectional view and the ventilation route of the permanent magnet rotating electrical machine of the first embodiment. Air flows as an arrow 20. For ventilation, with respect to the rotor 2, a rotor duct 15 is formed by stacking rotor cores 5 that use silicon steel sheets of 0.5 mm thickness and the like in a thickness of a certain extent to form a rotor packet 24 and thereafter interleaving duct pieces 14 manufactured of a metal such as aluminum and iron between the rotor packets 24, and is made a ventilation passage. With respect to the stator 1 also, in a similar manner, a stator duct 17 is formed by stacking the stator cores 13 that use silicon steel sheets of 0.5 mm thickness and the like in a thickness of a certain extent to form a stator packet 25 and thereafter interleaving duct pieces 16 manufactured of a metal such as aluminum and iron between the stator packets 25.

In the present embodiment, a cooler 22 that performs heat exchange with the outside of the permanent magnet rotating electrical machine is attached to the upper part of a frame 21 of the permanent magnet rotating electrical machine, and fans 23 are attached to both sides of the cooler 22. Although the fan 23 is of a type requiring external power in the present embodiment, fans attached to the shaft 6 may be used.

The air flow 20 generated by the fan 22 passes the rotor 1 through a space between the spiders 7, the gap 18, and the inter-pole ventilation passages 19. At this time, the axial air flow having passed through the space between the spiders 7 passes through the rotor ducts 15 and is introduced to the circumferential direction. The air having passed through the rotor ducts 15 flows to the stator ducts 17 via the gap 18, and returns to the cooler 22. Thus, the air flow inside the permanent magnet rotating electrical machine is formed. In the rotor ducts 15, heat generated in the permanent magnets 3 and heat generated in the rotor core 5 are removed. In the stator ducts 17, heat generated in the stator core 13 and the coils 10 is removed. By the effect of these ducts, the heat generation density of the permanent magnet rotating electrical machine can be increased, and therefore the permanent magnet rotating electrical machine can be miniaturized.

Although the rotor ducts 15 and the stator ducts 17 oppose with each other at an equal gap in the axial direction and the end section in the direction of the rotor axis ends at the rotor core in the present embodiment, the structure of the present invention is not limited to said one, the ducts may be off-set from each other, the width of the ducts may be different from each other, the number of pieces of the ducts may be different from each other, and the end section in the direction of the rotor axis may end at a point other than the rotor core.

Figure 3:
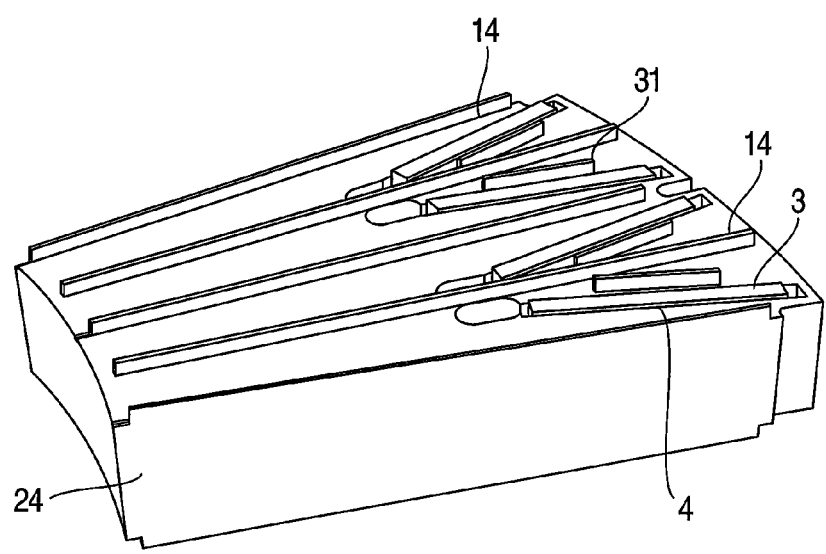
FIG. 3 is a perspective view showing a rotor of the first embodiment of the present invention. (embodiment 1)

FIG. 3 shows a perspective view of a portion of two poles of the rotor core of the first embodiment. In the present embodiment, with respect to the duct piece, there are two kinds, namely the duct piece 14 disposed long so as to extend penetratingly from the outer circumference to the inner circumference of the rotor core 5 and a duct piece 31 disposed short within the pole. These duct pieces are disposed so that the duct pieces do not buckle when a pressing force of several tons to several tens tons is applied in the axial direction so that the rotor is not disintegrated in forming the rotor packets 24 in the axial direction as a rotor, the rotor packet 24 being obtained by stacking the rotor cores 5. Because the duct piece 14 is formed of a metal such as aluminum and iron as described above, the size of the duct piece is determined based on the pressing force. The size of the rotating electrical machine becomes large when the capacity (output power) of the permanent magnet rotating electrical machine increases or when the rotational speed becomes slow even if the output power is constant. In this case, the pressing force in the axial direction increases and the size of the duct pieces 16 becomes large in order to disperse the pressing force so that the duct pieces 16 do not buckle. Also, in assembling the rotor 1, it is necessary to insert the permanent magnets in the axial direction. At this time, because the duct pieces 16 and the permanent magnets 3 interfere with each other, in the present embodiment, the shape of the permanent magnet insertion hole is made as described below.

Figure 4:
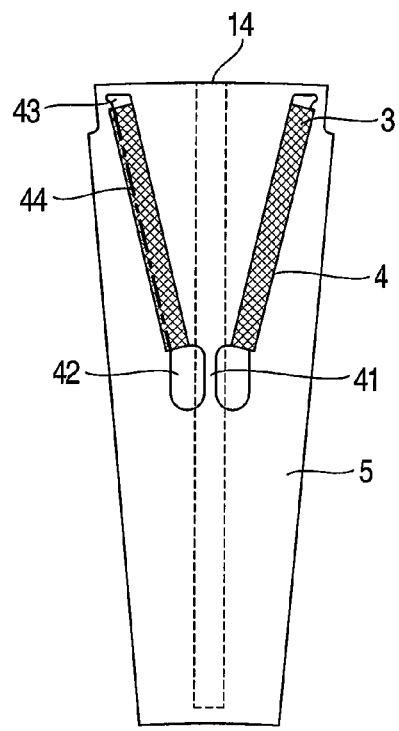
FIG. 4 is a sectional view of a portion of one pole showing the rotor of the first embodiment of the present invention. (embodiment 1)

FIG. 4 shows an axial sectional view of a portion of one pole of the rotor core of the first embodiment. Further, although the duct piece 14 does not exist on a same plane, the duct piece 14 is shown by a dotted line in order to facilitate the explanation.

As shown in the drawing, the magnet insertion holes 4 are disposed on a line extending from the center of the rotor core 5 to the outer circumference side of the duct piece 14 (To be disposed on a line extending from the center of the rotor core 5 to the outer circumference side of the duct piece 14 means to be disposed substantially on the line. Also, "the center of the rotor core 5" does not necessarily require to be the center point in its strict meaning.), the magnet insertion holes 4 are formed on both sides of the duct piece 14 so as to depart from the duct piece 14 as they extend from the center side of the rotor core 5 to the outer circumference side, and the magnet insertion holes 4 have inner circumference side voids 42 that expands larger than the thickness of the permanent magnet 3 from the inner circumference side end position of the permanent magnets 3 inserted toward the duct piece 14 side. By forming the shape of the magnet insertion holes 4 thus, in inserting the permanent magnet in the axial direction, the permanent magnet can be inserted without interference of the duct piece 14 and the permanent magnet. The magnet insertion holes 4 are disposed so as to be shifted from and not to overlap with the duct piece in the rotation axis direction of the rotor. Because the inner circumference side void 42 is merely a void, even when it overlaps with the duct piece in the rotation axis direction, there is no possibility of overlapping with the duct piece in inserting the permanent magnet. Therefore, in assembling the rotor, the magnet and the duct piece can be prevented from interfering with each other. Further, although the flow of coolant can be made smooth and the cooling performance is improved by arranging the duct piece, by disposing the magnet insertion holes 4 so as not to overlap with the duct piece (so as to be shifted from the duct piece in the circumferential direction of the rotor), the flow of the coolant becomes smoother. In order to prevent the short circuit of the magnetic flux of the permanent magnet 3, it is preferable to arrange the void parts in the inner circumference side end and the outer circumference side end of the magnet insertion hole 4. In the present embodiment, the inner circumference side void 42 and an outer circumference side void 43 are arranged, the magnetic resistance of the magnetic flux short circuit section of the permanent magnet 3 increases by reducing the rotor core 5 contacting the end of the permanent magnet 3, and the electric characteristics improve. Also, by disposing the permanent magnets 3 on the outer circumference side, the magnetic flux is allowed to easily flow to the stator side, and thereby the electric characteristics can be improved. Therefore, it is preferable that the area of the outer circumference side void 43 in the cross section orthogonal to the rotational axis of the rotor core (it should just be a cross section substantially orthogonal, and is not to be necessarily orthogonal in its strict meaning) is smaller than the area of the inner circumference side void 42 in said cross section. In the present embodiment, the edge on the outer circumference side of the outer circumference side void 43 is made parallel to the outer circumference of the rotor the edge opposes (it is sufficient to be substantially parallel, and it is not required to be mathematically strictly parallel) (in other words, by making the rotor outer circumference side shape of the outer circumference side void 43 parallel to the outer circumference of the rotor), relaxation of the stress and improvement of the electric characteristics achieved by approach of the permanent magnet 3 to the rotor outer circumference side are achieved, and the permanent magnet rotating electrical machine becomes more compact.

Also, a yoke part 41 is formed between the inner circumference side void 42 that oppose each other in expanding from the inner circumference side end position of the magnet insertion holes 4 toward the duct piece side. Because the centrifugal force applied to a member on the outer circumference side of the yoke part 41 comes to be supported by the yoke part 41, it is preferable that the magnet insertion holes 4 have roundness (in other words, to have R section) for relaxing the stress namely have a funnel-like shape in the circumferential direction of the yoke part. With respect to how the section in question is rounded and a method for forming the funnel-like shape, although a case a portion corresponding to a tube of the funnel (a portion the outer circumference side and the inner circumference side of the yoke part 41 in the yoke part 41 are connected to each other) extends from the inner circumference side to the outer circumference side and a case a portion corresponding to a tube of the funnel extends from the outer circumference side to the inner circumference side are possible, here, it is to be noted that the case the portion corresponding to a tube of the funnel extends from the outer circumference side to the inner circumference side is preferable in particular.

Also, in the magnet insertion hole 4, in order to facilitate insertion of the magnet in the axial direction, a magnet slot 44 shown in a single-dot chain line is formed. The magnet slot 44 is disposed so as to have the width nearly equal to the width (here, the width in the circumferential direction is meant) of the permanent magnet 3 (the width should just be substantially nearly equal, and there may be a space nearly equal to the tolerance for example), as the magnet slot 44 is deeper, the permanent magnet is inserted more easily, however, because the short circuit of the magnetic flux of the magnet occurs between the inner circumference side and outer circumference side ends of the magnet, the magnet slot 44 is preferable to be as thin as possible.

Figure 5:
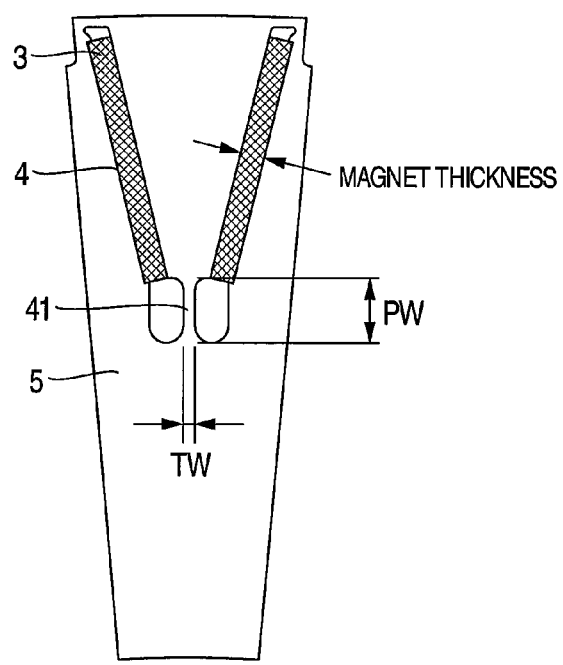
FIG. 5 is a sectional view of a portion of one pole showing the rotor of the first embodiment of the present invention. (embodiment 1)
Figure 6:
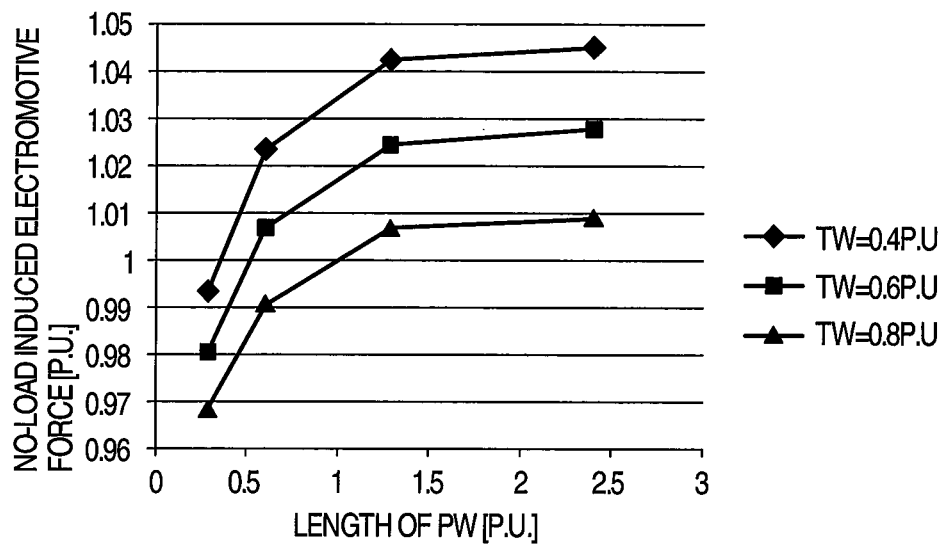
FIG. 6 is a drawing showing a shape effect of the first embodiment of the present invention. (embodiment 1)

FIG. 5 shows an explanatory drawing in which the width of the yoke part 41 of the first embodiment is made TW, and the height in the circumferential direction of the inner circumference side void 42 is made PW. FIG. 6 shows a graph in which TW and PW are standardized with the magnet width being made 1, and the voltage of the no-load induced electromotive force required when the permanent magnet rotating electrical machine outputs a rated output is standardized as 1. As shown in the drawing, it is known that the required voltage is surpassed and the condition fulfills requirement of the permanent magnet rotating electrical machine in a case of TW<0.8 and PW>1.3 and in a case of TW<0.6 and PW>0.6.

[Embodiment 2]

Embodiment 2 will be described using FIG. 7. Also, with respect to the position duplicating that of embodiment 1, the description here will be omitted. In the present embodiment, a case is shown in which the inter-pole ventilation passages 19 are connected to each other in the rotation axis direction at the rotor outer circumference part in particular.

Figure 7:
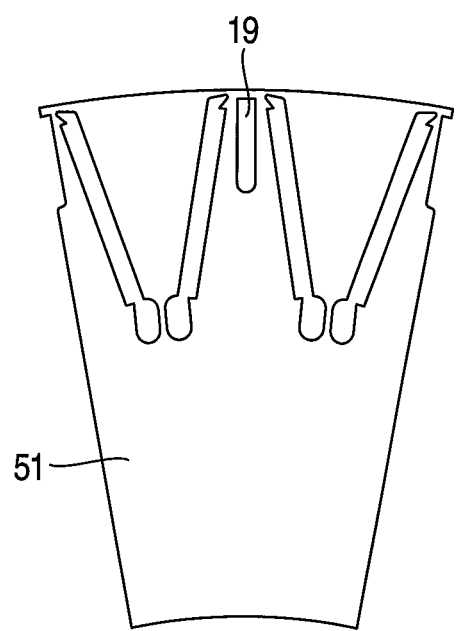
FIG. 7 is a sectional view of a portion of two poles showing a permanent magnet rotating electrical machine of a second embodiment of the present invention. (embodiment 2)

FIG. 7 shows a sectional view of a portion of two poles of the rotor core of the second embodiment. The inter-pole ventilation passages 19 may be connected to each other at the rotor outer circumference part. By connection at the outer circumference part, because the strength of a rotor core 51 increases, use at a higher speed is possible, and the damage of the core in assembling the rotor and injury of a worker caused by a portion of the inter-pole ventilation passage 19 do not occur.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A permanent magnet rotating electrical machine comprising:
   a stator having armature coils inside a plurality of slots formed in a stator core;
   a rotor obtained by stacking a plurality of rotor cores each including a plurality of magnetic poles, the rotor cores being provided with magnet insertion holes in layers with gaps, the gaps being provided by interposing sets of first and second duct pieces between the rotor cores, the rotor cores to rotate around a rotational axis; and permanent magnets inserted to the magnet insertion holes, wherein at least the first duct piece of each set of first and second duct pieces is disposed on a line extending from a center of the rotor core to an outer circumference side of the rotor core, the magnet insertion holes are formed on both sides of each first duct piece so as to depart from the first duct piece as the magnet insertion holes extend from the side of the center of the rotor core to the outer circumference side, the second duct pieces of each set of first and second duct pieces are disposed between the first duct piece and the magnet insertion holes in the circumferential direction within each of the magnetic poles, the magnet insertion holes are disposed so as to shift from the first duct piece in a circumferential direction of the rotor so as not to overlap with any of the first and second duct pieces in an axial direction along the rotational axis of the rotor cores, and the magnet insertion holes each have an inner circumference side void extending from the inner circumference side end of the permanent magnet toward the first duct piece, the inner circumference side void having a length in the circumferential direction wider than a thickness in the circumferential direction of the permanent magnets.

2. The permanent magnet rotating electrical machine according to claim 1, wherein
the magnetic insertion holes include outer circumference side voids formed from the outer circumference side ends of the permanent magnets.

3. The permanent magnet rotating electrical machine according to claim 2, wherein
an edge on the outer circumference side of the outer circumference side void is parallel to the outer circumference of the rotor the edge opposes.

4. The permanent magnet rotating electrical machine according to claim 2, wherein
an area of the outer circumference side void in a cross section orthogonal to the rotational axis of the rotor core is smaller than an area of the inner circumference side void in the cross section.

5. The permanent magnet rotating electrical machine according to claim 1, wherein
each of the magnet insertion holes includes a magnet slot having a width nearly equal to the thickness of the permanent magnet.

6. The permanent magnet rotating electrical machine according to claim 1, wherein
each of the magnet insertion holes includes a magnet slot that matches the thickness of the permanent magnet, and serves as a guide in inserting the permanent magnet in the axial direction.

7. The permanent magnet rotating electrical machine according to claim 1, wherein
an outside in the circumferential direction of a yoke part sandwiched by the inner circumference side voids in one magnetic pole of the rotor has a rounded shape.

8. The permanent magnet rotating electrical machine according to claim 7, wherein
when a width of the yoke part is TW, a height in a radial direction of the inner circumference side void is PW, and the thickness of the permanent magnet is PMT, then TW<0.8 times PMT and PW>1.3 times PMT, or TW<0.6 times PMT and PW>0.6 times PMT.

9. The permanent magnet rotating electrical machine according to claim 1, wherein
inter-pole ventilation passages are arranged at positions between magnet poles of the rotor.

10. The permanent magnet rotating electrical machine according to claim 9, wherein
rotor circumference parts of the inter-pole ventilation passages are connected to each other in the axial direction of the rotor cores.

* * * * *